Jan. 24, 1956     J. B. CAROLUS     2,732,506
SYSTEMS FOR CONTROLLING GENERATING UNITS
Filed Oct. 27, 1951     6 Sheets-Sheet 1

INVENTOR.
JAMES B. CAROLUS
BY
*Woodcock and Phelan*
ATTORNEYS

Jan. 24, 1956  J. B. CAROLUS  2,732,506
SYSTEMS FOR CONTROLLING GENERATING UNITS
Filed Oct. 27, 1951  6 Sheets-Sheet 2

INVENTOR.
JAMES B. CAROLUS
BY
Woodcock and Phelan
ATTORNEYS

*INVENTOR.*
JAMES B. CAROLUS
BY
Woodcock and Phelan
ATTORNEYS

Jan. 24, 1956  J. B. CAROLUS  2,732,506
SYSTEMS FOR CONTROLLING GENERATING UNITS
Filed Oct. 27, 1951  6 Sheets-Sheet 4

INVENTOR.
JAMES B. CAROLUS
BY
*Woodcock and Phelan*
ATTORNEYS

Jan. 24, 1956   J. B. CAROLUS   2,732,506
SYSTEMS FOR CONTROLLING GENERATING UNITS
Filed Oct. 27, 1951   6 Sheets-Sheet 5

INVENTOR.
JAMES B. CAROLUS
BY
Woodcock and Phelan
ATTORNEYS

Jan. 24, 1956   J. B. CAROLUS   2,732,506
SYSTEMS FOR CONTROLLING GENERATING UNITS
Filed Oct. 27, 1951   6 Sheets-Sheet 6

INVENTOR.
JAMES B. CAROLUS
BY
*Woodcock and Phelan*
ATTORNEYS

United States Patent Office 2,732,506
Patented Jan. 24, 1956

2,732,506

SYSTEMS FOR CONTROLLING GENERATING UNITS

James B. Carolus, Elkins Park, Pa., assignor to Leeds and Northrup Company, Philadelphia, Pa., a corporation of Pennsylvania Application October 27, 1951, Serial No. 253,533

17 Claims. (Cl. 307—57)

This invention relates to systems for controlling the loads of interconnected generators, generating stations or systems, generically termed generating units, in correction for deviations from the scheduled magnitude of line frequency, tie-line load or other operating variable.

In accordance with the present invention, the magnitude of the system variable and the outputs of the respective generating units are monitored at a supervisory station, such as a load-dispatcher's office. For small deviations from schedule, signals demanding corrective change of output are transmitted from the supervisory station to the generating stations in sequence maintaining desired relations of the outputs of the units with reference to a selected one of them until the deviation is corrected, whereas for larger deviations, the signals are transmitted simultaneously to the reference station and also to the others, preferably to the others in sequence maintaining the desired load relation, until the deviation is reduced to magnitude for which sequential control of all units is resumed. For brevity, the aforesaid control for small deviations is termed "sequence" control and the aforesaid control for larger deviations is termed "simultaneous" control.

More specifically, for sequence control one of the units is selected as a reference or master to which the corrective signals are sent until predetermined change of its load is effected whereupon they are transferred to a slave or follower unit until its new load bears a predetermined relation to the new load of the reference unit and so on until the deviation is corrected, the change of load in each slave unit before transfer of signals to the next being held to a predetermined relation with the change in load of the reference. For simultaneous control, the signals are sent to the master station for continuous change of its output until the deviation is reduced to the sequential control magnitude and during that time the signals are also simultaneously sent to each slave unit until its output bears desired load relation to the master.

In a preferred arrangement for automatically performing the above method of control, there are provided sequence relays which are controlled in accordance with the unbalance between networks respectively including impedances adjusted by meters responsive to the outputs of the respective generating units. The sequence relays, so controlled, transfer "raise" or "lower" signals from one to another of the units so that each in turn picks up or drops load so long as the deviations from schedule are small. For larger deviations, another relay modifies the circuit relations established by the sequence relays so that the signals are simultaneously transmitted to the master unit and to the others until the deviation is reduced for resumption of sequence control.

For a more detailed understanding of the invention and for illustration of embodiments thereof, reference is made to the following detailed description and the accompanying drawings in which:

Fig. 1 schematically illustrates a group of generating units for control in accordance with the invention;

Fig. 2 schematically illustrates an automatic supervisory station;

Figure 1:
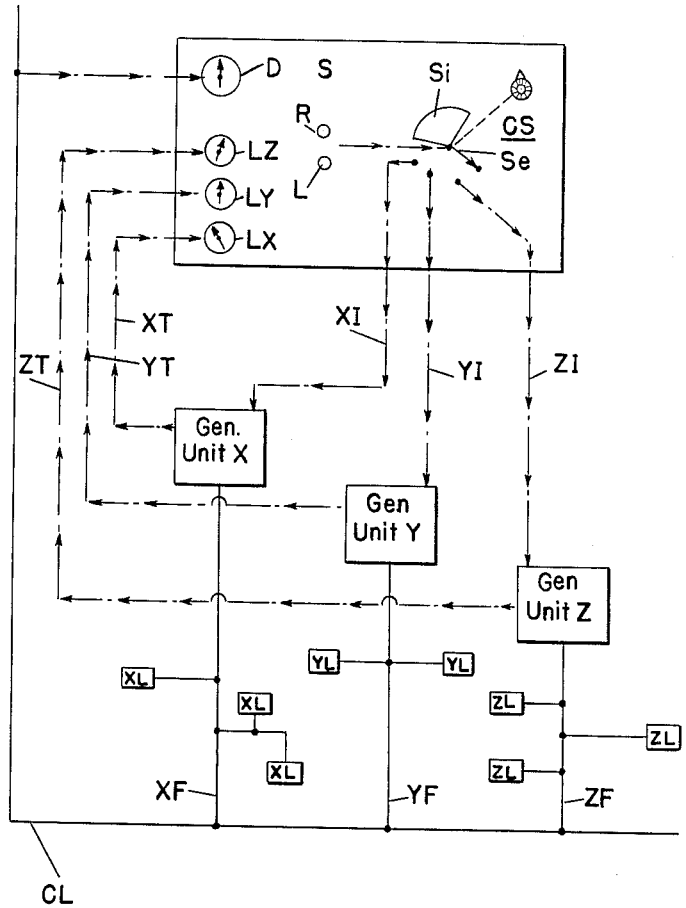

Referring to Fig. 1 for explanation of a relatively simple system to which the invention is applied, the blocks X, Y and Z each generically represents a generating unit which may be a single generator-prime mover unit, a generating station including two or more such generator-prime mover units, or a generating system including two or more generating stations. The generating units X, Y and Z are respectively connected by feeders XF, YX and ZF to supply power to a common line CL which may be a tie-line connecting the group of generating units to a larger power-distribution system. Each of the generating units X, Y, Z may also supply power to individual local loads generically represented by blocks XL, YL and ZL.

The outputs of the individual generating units X, Y, Z are monitored at a supervisory station generically represented by block S. This load information may be transmitted from the respective generating units to the supervisory station S by suitable telemetering channels represented by broken lines XT, YT and ZT for respective actuation of metering instruments represented by the circles LX, LY and LZ. The circle D represents a metering instrument responsive to deviations of a system variable, such for example as system frequency, tie-line load, or a combination of both, from a scheduled value thereof usually fixed by contractual relations.

To provide for control of the inputs of the generating units X, Y, Z from the supervisory station S, there are provided signal channels XI, YI, ZI. The small circles R and L generically represent sources of "raise" and "lower" signals to be transmitted from the supervisory station over the signal channels to the generating units.

The multi-position switch CS is generically representative of a circuit-controlling device or arrangement for applying the input control signals to any selected one or more of the channels XI, YI, ZI. In the particular exemplary arrangement shown in Fig. 1, the switch CS has a narrow contact SE for individually engaging terminal contacts of the respective channels XI, YI, ZI and a wide contact SI for simultaneously engaging any pair, or all, of these terminal contacts.

A load dispatcher upon observing a small deviation from the scheduled value of the system variable, effectively energizes source R or L, depending upon whether "raise" or "lower" signals are required and positions contact SE of switch CS for transmission of the signals to a particular generating unit, for example, unit Z. When in response to the signal the changing load of unit Z attains a predetermined relation to that of another unit, for example, unit Y, contact SE of switch CS is moved to discontinue transmission of signals to unit Z, and instead, to transmit them to unit Y, for example, for corrective change of its load. When in response to the signal the changing load of unit Y attains a predetermined relation to that of unit X, the switch CS is again operated to discontinue transmission of signals to unit Y and transfer them to unit X for corrective change of its load; the sequence may be performed in the same or different order or repeated in whole or in part as many times as necessary until return of the system variable to its scheduled value during which time the desired load relations between generating units X, Y, Z are maintained.

In brief, for small deviations from schedule of the system variable, the generation of the controlled group X, Y, Z is effected by sequential incremental changes of the outputs of the individual units to maintain a close approximation of the desired relations between the loads of the controlled units during change of their generation in correction for the deviation of the system variable.

When, however, there is a large deviation from the scheduled value of the selected system variable, the load dispatcher or supervisor positions the wide contact SI of switch CS simultaneously to transmit "raise" or "lower" signals (whichever is required for correction of the deviation) to any pair or all of the controlled units for rapid correction of the deviation; preferably, the position of contact SI is shifted to different pairs to preserve a desired relation of the loads of the individual units. When as observed from meter D, the deviation has been reduced to a value rather closely approximating the scheduled value, the supervisor operates switch CS to resume the sequential control of the units individually as above previously described.

In everyday operation of power-distribution systems, the line frequency, for example, is subject to frequent small deviations and more infrequently to large deviations. By the control system above described, correction for the small deviations is effected without need for excessive regulation of individual generating units, all of which, however, are available for concurrent control in correction of large deviations and all of which are subject to control in maintenance of predetermined relations between their individual loads. These same advantages obtain when some other system variable, such as tie-line load, or a combination of both load and frequency is selected as the control variable.

Figure 2:
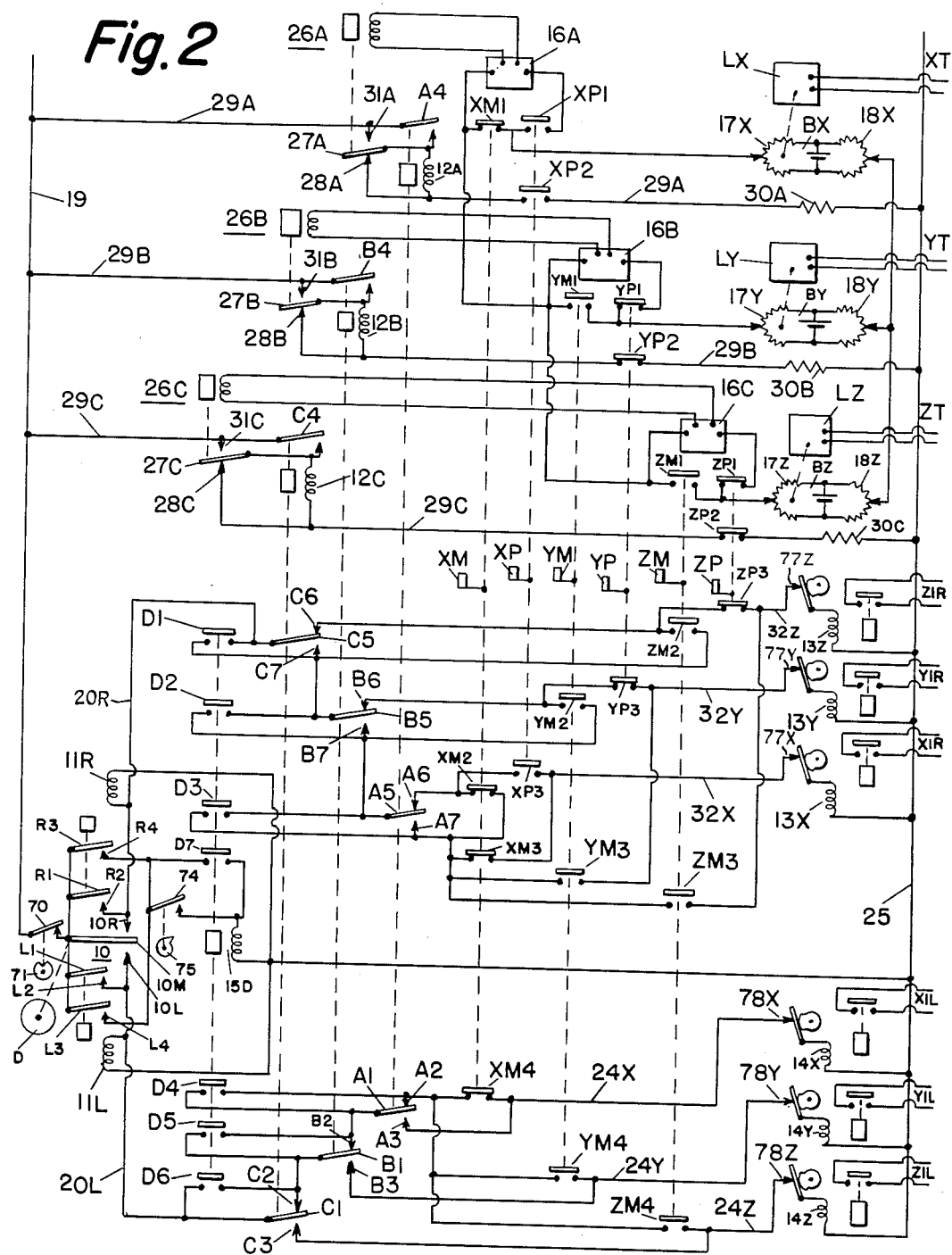

The arrangement shown in Fig. 2 is one form of automatic supervisor suitable for performing the method of control above described in connection with Fig. 1. In Fig. 2, the deviation meter D cooperates with associated electrical equipment including switch 10 and sense relays 11R, 11L to produce the "raise" or "lower" signals to be utilized as discussed in connection with Fig. 1.

For small deviations, the "raise" signals under control of the sequence relays 12A, 12B, 12C are applied individually to excite the "raise" relays 13X, 13Y, 13Z and the "lower" signals under control of these sequence relays are applied individually to excite the "lower" relays 14X, 14Y, 14Z.

For large deviations, the relay 15D is energized to modify the signal transmission paths established by the sequence relays 12A, 12B, 12C.

The detectors 16A, 16B, 16C are included in a network having slidewires 17X, 17Y, 17Z respectively positioned by the meters LX, LY, LZ in accordance with the existing load upon the respective generating units X, Y, Z (not shown in Fig. 2) which are interconnected as in Fig. 1 to supply or receive power over a tie-line. The detectors 16A, 16B, 16C may, for example, be of the type disclosed in United States Letters Patent 2,530,326, Davis, and 2,113,164, Williams.

The meter-operated slidewires 17X, 17Y, 17Z are respectively in circuit with the manually adjustable slidewires 18X, 18Y, 18Z in bridge circuits BX, BY, BZ.

The gang switches XM, YM, ZM and gang switches XP, YP, ZP are provided for selection of one of the generating units X, Y, Z as a master or reference unit and for establishing the required detector and sequence relay connections corresponding with the selection made.

Assuming that unit X is to be the reference unit, the switches XM, YP, ZP are moved by the supervisor to the closed positions shown in Fig. 2. In such case, as may be traced from Fig. 2, the input circuit of detector 16B is connected between the contacts of slidewires 17X, 17Y through contact XM1 of switch XM and contact YP1 of switch YP; the input circuit of detector 16C is connected between the contacts of slidewires 17X and 17Z through contact XM1 of switch XM and contact ZP1 of switch ZP. The input circuit of detector 16A is open as this detector does not function when unit X is selected as the reference unit.

The slidewires 18X, 18Y, 18Z of the balanceable networks BX, BY, BZ are set by the supervisor in accordance with a load relation to be maintained between the generating units X, Y, Z. The supervisory system is now in readiness automatically to perform the method above described in connection with Fig. 1 with generating unit X as the master or reference unit.

It is now assumed there occurs a small deviation in the selected system variable requiring decrease of generation by units X, Y, Z for correction of the deviation: it is also assumed that the potential of each of the contacts of the slave unit slide-wires 17Y, 17Z is the same as the potential of the contact of the master unit slidewire 17X. In such case, the movable contact 10M of switch 10 is moved by the deviation meter D into engagement with contact 10L to energize relay 14X for transmission of "lower" signals to generating unit X. This energizing circuit can be traced from supply line conductor 19 through switch 10, conductor 20L, contact C1, C2 of deenergized relay 12C, contacts B1, B2 of deenergized relay 12B, contacts A1, A2 of deenergized relay 12A, contact XM4 of switch XM, conductor 24X and the coil of relay 14X to the other supply conductor 25.

In response to the "lower" signals sent to generating unit X over the control signal channel XIL by relay 14X, the input to unit X is lowered with consequent change in setting of slidewire 17X by meter LX responsive to the output of generating unit X. Upon an appreciable lowering of the output of unit X, the unbalance between networks BX and BY, as measured by detector 16B, sufficiently energizes transfer relay 26B that its contact 27B moves into engagement with contact 31B to effect energization of sequence relay 12B and the unbalance between networks BX and BZ, as measured by detector 16C, sufficiently energizes transfer relay 26C that its contact 27C moves into engagement with contact 31C to effect energization of sequence relay 12C. The energizing circuit of sequence relay 12B can be traced between the supply lines 19, 25 over conductor 29B including contact YP2 of switch YP. The energization of relay 12B effects movement of its contact B4 to complete a seal-in circuit about contacts 27B, 31B of transfer relay 26B. The energizing circuit of relay 12C can be traced between supply lines 19, 25 over conductor 29C which includes contact ZP2 of switch ZP.

Figure 3A:
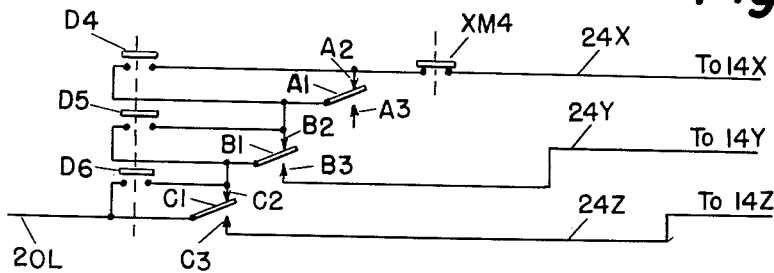
Figs 3A–3C are explanatory figures showing the "lower" circuits of Fig. 2 with different units as the master.

The energization of relay 12C also effects movement of its contact C1 from engagement with contact C2 and into engagement with contact C3. Thus, the path of the "lower" signals to relay 14X is broken and a path for them to relay 14Z is established between supply conductors 19, 25 through contacts C1, C3 of relay C, and conductor 24Z. This re-routing of the "lower" signal from relay 14X to relay 14Z is more easily traced in Fig. 3A, the contact C1 of sequence relay 12C then being in the lower position in engagement with fixed contact C3.

In response to the "lower" signals sent to generating unit Z over channel ZIL (Fig. 2), the input to unit Z is lowered with resultant change in setting of slidewire 17Z by the meter LZ. Upon appreciable lowering of the load of unit Z, the unbalance between networks BX, BZ, as measured by detector 16C, is reduced sufficiently to deenergize transfer relay 26C that its contact 27C moves into engagement with contact 28C, so to effect deenergization of sequence relay 12C. The resistor 30C limits the current through this circuit when the relay coil is shorted by contacts 27C, 28C.

The deenergization of relay 12C effects movement of its contact C4 to interrupt its seal-in circuit about contacts 27C, 31C of the transfer relay 26C. The deenergization of relay 12C also effects movement of its contact C1 from engagement with contact C3 and into engagement with contact C2. Thus, the path of the "lower" signals to relay 14Z is broken and a path for them to relay 14Y is established through conductor 20L, contacts C1, C2 of relay 12C, contacts B1, B3 of relay 12B, and conductor 24Y. This path can more easily be traced in Fig. 3A, the contact B1 of relay 12B then being in the lower position in engagement with fixed contact B3. Consequently the "lower" signals are now transmitted to generating unit Y over channel Y1L.

Upon appreciable lowering of the load of unit Y, the unbalance between networks BX, BY, as measured by detector 16B, is reduced sufficiently to deenergize transfer relay 26B that its contact 27B moves into engagement with contact 28B so to deenergize sequence relay 12B so that its contact B1 reengages contact B2. Resistor 30B limits the current through this circuit when the coil of relay 12B is shorted by contacts 27B, 28B. This completes a sequence of control of the three units X, Y, Z.

Thus, the "lower" signals resulting from a small deviation of the system variable have been utilized sequentially to lower the generation of the controlled units X, Y, Z, in correction of the deviation and with maintenance of a predetermined load relation between them. If full correction of the deviation is obtained or occurs before the sequence is completed, contact 10 returns to its neutral position, deenergizing the particular "lower" relay 14X, 14Y or 14Z then in circuit.

If, on the other hand, full correction of the deviation is not obtained upon completion of the sequence, the "lower" signals are sent to relay 14X, it being recalled that the position of the contacts of the relays 12A, 12B, 12C at the end of the sequence are the same as the start and therefore in readiness for another sequence.

Figure 3B:
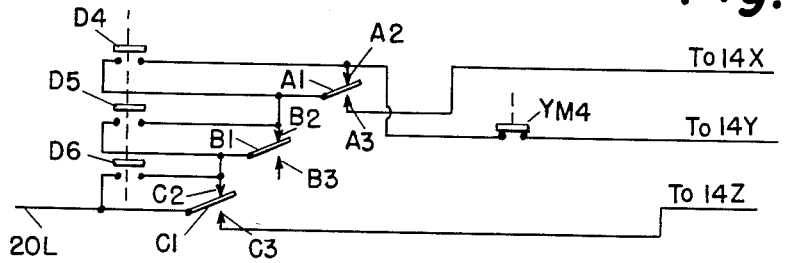

Similarly, for selection of unit Y as the master, the switches YM, ZP and XP are closed so that relay 12B remains deenergized and so that detector 16B is not utilized. In this case, the potential of the contact of slidewire 17Y is the reference and detectors 16A, 16C control the sequence relays 12A, 12C. The paths for the "lower" signals to the "lower" relays 14X, 14Y, 14Z as effected for the different positions of the contacts of the sequence relays 12A, 12C can be traced most easily in Fig. 3B.

Figure 3C:
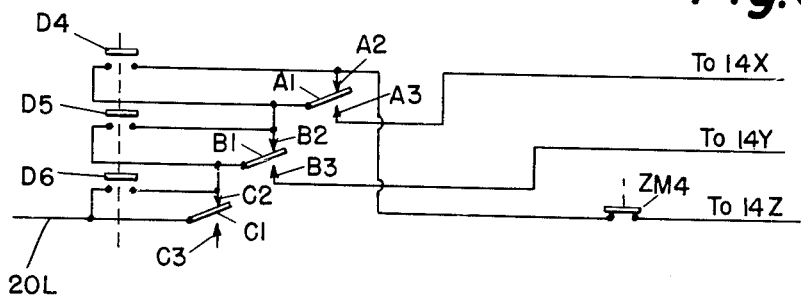

In like manner, for selection of unit Z as the master, the switches ZM, XP, YP are closed so that relay 12C remains deenergized and that detector 16C is not utilized. In this case, the potential of the contact of slidewire 17Z is the reference and the detectors 16A, 16B control the sequence relays 12A, 12B. The paths of the "lower" signals to the "lower" relays 14X, 14Y, 14Z as effected for different positions of the contacts of the sequence relays 12A, 12B can be traced more easily in Fig. 3C.

To effect sequential operation of the "raise" relays 13X, 13Y, 13Z when contact 10M engages contact 10R, there may be utilized a duplicate set of sequence and transfer relays. However, as shown in Fig. 2, it is preferred to provide the sequence relays 12A, 12B, 12C and the switches XM, YM, ZM, XP, YP, ZP with additional contacts so connected that such duplication is avoided.

It is now assumed that with the loads in balance and X as the master unit there occurs a small deviation of a system variable in sense requiring increase of generation by units X, Y, Z for correction of the deviation. In this case, the movable contact 10M of switch 10 is moved by the deviation meter D into engagement with the contact 10R. Relays 12C, 12B then being deenergized, the "raise" relay 13Z is energized through a circuit traced from line conductor 19 through switch 10, conductor 20R, contacts C5, C6 of relay 12C, contact ZP3 of switch ZP, and conductor 32Z through the coil of relay 13Z to line conductor 25.

In response to the "raise" signals sent to generating unit Z over channel Z1R, the input to unit Z is raised with consequent change in setting of slidewire 17Z by meter LZ. Upon appreciable increase in load of unit Z, the unbalance between networks BX and BZ, as measured by detector 16C, sufficiently energizes relay 26C to move its contact 27C into engagement with contact 31C to energize relay 12C.

The energization of relay 12C effects movement of its contact C4 to complete a seal-in circuit about contacts 27C, 31C of the transfer relay 26C. The energization of relay 12C also effects movement of its contact C5 from engagement with contact C6 into engagement with contact C7. Thus, the path of the "raise" signals to relay 13Z is broken. Assuming relay 12B to be deenergized, the "raise" signals are routed to raise relay 13Y from line conductor 19 through switch 10, contacts C5, C7 of relay 12C, contacts B5, B6 of relay 12B, contact YP3 of switch YP, conductor 32Y and the coil of relay 13Y to line conductor 25.

In response to the "raise" signals now sent to generating unit Y over channel Y1R, the input to unit Y is raised with consequent change in setting of slidewire 17Y by meter LY. Upon appreciable increase of the load of unit Y, the unbalance between networks BX, BY, as measured by detector 16B, sufficiently energizes transfer relay 26B to move its contact 27B into engagement with contact 31B to energize the sequence relay 12B.

Consequently the path of the "raise" signals to relay 13Y is broken and a path for them to relay 13X from line 19 is completed through a circuit including switch 10, conductor 20R, contacts C5, C7 of relay 12C, contacts B5, B7 of relay 12B, contacts A5, A6 of relay 12A, contacts XM2, XM3 of switch XM, and conductor 32X.

Figure 4A:
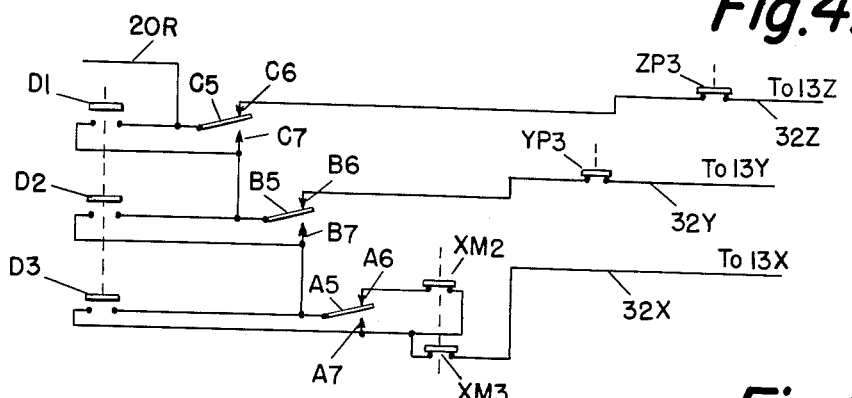
Figs. 4A–4C are explanatory figures showing the "raise" circuits of Fig. 2 with different units as the master.

Upon appreciable increase of the load of unit X, with consequent change in the reference potential of the contact of slidewire 17X, the outputs of detectors 16B, 16C fall to deenergize the transfer relays 26B, 26C. The resulting closure of contacts 27C, 28C of the transfer relays 26B, 26C effect deenergization of relays 12C, 12B whose contacts return to the upper position of Figs. 2 and 4-A.

Thus the "raise" signals, due to a small deviation, have been utilized sequentially to raise the generation of the controlled units in correction of the deviation and with maintenance of preestablished load relations between them. If full correction is obtained before the sequence is completed, contact 10 returns to its neutral position, deenergizing the particular "raise" relay 13X, 13Y or 13Z then in circuit.

If, on the other hand, full correction is not obtained, the sequence is automatically repeated, it being recalled that the position of the contacts of relays 12A, 12B, 12C are the same at the end of the sequence as they were at the start so that the system is in readiness for another sequence.

Figure 4B:
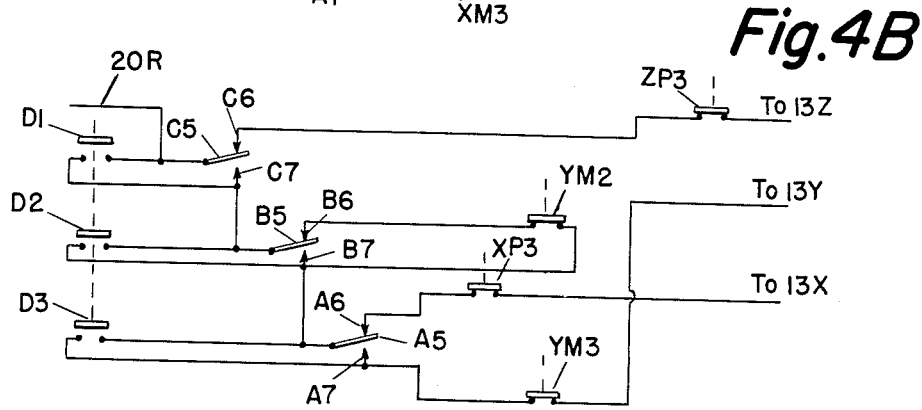
Figure 4C:
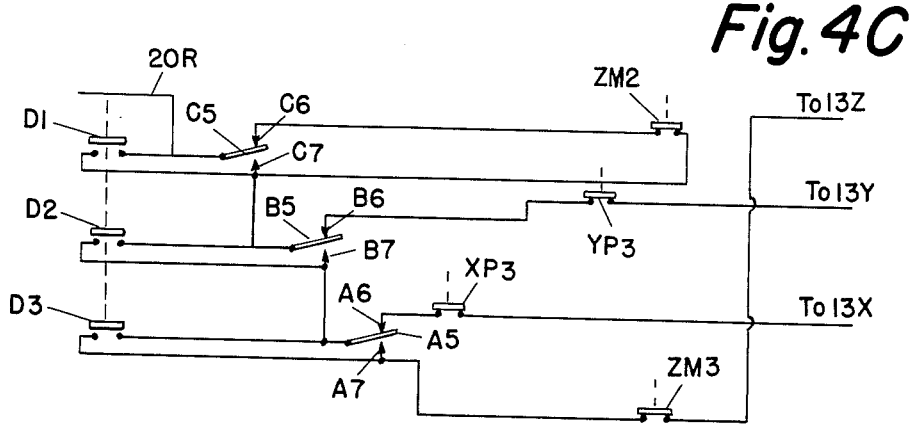

When unit Y is selected as the master, the relay 12B remains deenergized and the relays 12A, 12C are controlled by detectors 16A, 16C. The closed contact YM2 of switch YM provides a continuous connection between fixed contacts B6, B7 of relay 12B. As best shown in Fig. 4B, when relay 12C is deenergized, the "raise" signals are impressed upon "raise" relay 13Z through contact ZP3 of switch ZP and contacts C5, C6 of relay 12C. When relays 12C and 12A are energized, the "raise" signals are impressed upon "raise" relay 13Y through contacts C5, C7 of relay 12C, contacts B5, B6 of relay 12B, contact YM2 of switch YM, contacts A5, A7 of relay 12A, and contact YM3 of switch YM. With relay 12C energized and 12A deenergized, the "raise" signals are routed to raise relays 13X through contacts C5, C7 of relay 12C, contacts B5, B6 of relay 12B, contact YM2 of switch YM, contacts A5, A6 of relay 12A and contact XP3 of switch XP.

When unit Z is selected as the master, the relay 12C remains deenergized and relays 12A, 12B are controlled by detectors 16A, 16B. The routing of the "raise" signals to the "raise" relays 13X, 13Y, 13Z for the different positions of the contacts of sequence relays 12A, 12B can readily be traced in Fig. 4C in view of prior description.

For large deviations from the scheduled value of the selected system variable, the relay 15D (Fig. 2) is energized, as by one of the arrangements later described, to provide signal paths allowing simultaneous energization of all of the "raise" relays 13X, 13Y, 13Z or all of the "lower" relays 14X, 14Y, 14Z, depending upon the sense of the deviation.

It will first be assumed that the large deviation is in sense requiring reduced generation by units X, Y, Z so that switch 10 through its contact 10L connects supply conductor 19 to conductor 20L of the "lower" signal circuit. With relay 15D energized, and assuming that unit X is the selected reference or master unit, the closed contacts D6, D5, D4 of relay 15D complete a circuit from conductor 20L through contact XM4 of switch XM and conductor 24X for energization of signal relay 14X regardless of the positions of the contacts of the sequence relays 12B, 12C. As most clearly shown in Fig. 3A, if either or both of relays 12B, 12C is then or subsequently energized, the "lower" signals are also simultaneously impressed upon either or both of the lower signal relays 14Y, 14Z, the circuit for relay 14Z being completed by contacts C1, C3 of relay 12C and the circuit for relay 14Y being completed through contact D6 of relay 15D and contacts B1, B3 of relay 12B. Thus, until the deviation is reduced to a value for which sequential operation is resumed, the output of unit X is continuously reduced and the outputs of the other units are simultaneously subject to control each for reduction at a rate which cannot exceed the rate of reduction of load by the master unit.

When the deviation is reduced to such value that relay 15D is deenergized, the control reverts to sequential control as above described.

Similarly when unit Y is the master unit, a path for the "lower" signals to lower relay 14Y is continuously maintained through contacts D4, D5, D6 of relay 15D and contact YM4 of switch YM. Simultaneously therewith, the "lower" signals may be impressed upon either or both of the "lower" signal relays 14X, 14Z under control of the sequence relays 12A, 12C so that units X and Z cannot drop load faster than the master Y. The paths may easily be traced from Fig. 3B.

Likewise when unit Z is the master unit, the contacts D4, D5, D6 of relay 15D maintain a continuous path to the "lower" relay 14Z through contact ZM4 of switch ZM. Simultaneously therewith, the "lower" signals may be impressed upon either or both of "lower" relays 14X, 14Y under control of the sequence relays so that units X and Y cannot drop load faster than master unit Z. These paths may easily be traced in Fig. 3C.

Now assuming that the large deviation is in sense requiring increased generation so that the switch 10 (Fig. 2) through its contact 10R connects supply conductor 19 to conductor 20R of the "raise" signal circuit, and assuming that unit X is the reference or master unit, the closed contacts D1, D2, D3 of the energized relay 15D and contacts XM3 of switch XM provide a path for the "raise" signals to "raise" relay 13X regardless of the position of the contacts of the sequence relays 12B, 12C. As most easily seen from Fig. 4A, if either or both of relays 12B, 12C are then or subsequently deenergized, the "raise" signals are also simultaneously impressed upon either or both of the "raise" signal relays 13Y, 13Z, the circuit for "raise" signal relay 13Y being completed through contact D1 of relay 15D, contacts B5, B6 of deenergized relay 12B, and contact YP3 of switch YP; and the circuit for "raise" relay 13Z being completed by contacts C5, C6 of deenergized relay 12C, and contact ZP3 of switch ZP. Thus, until the deviation is reduced to a magnitude for which sequential control is resumed, the output of unit X is continuously increased and simultaneously therewith, the outputs of the other units are subject to control for increase of output at a rate which does not exceed that of the reference unit X. When the deviation is reduced to such value that relay 15D is deenergized, the control reverts to sequential control as above described.

Similarly, when unit Y is the master unit, a path for the "raise" signals to "raise" relay 13Y is continuously maintained through contacts D1, D2, D3 of relay 15D and contact YM3 of switch YM. The "raise" signals may additionally be routed to either or both of the "raise" relays 13X, 13Z under control of the sequence relays 12A, 12C so that units X, Z cannot be controlled to pick up load faster than master unit Y. The signal paths can readily be traced in Fig. 4B.

In like manner when unit Z is the master unit, a path for the "raise" signals to "raise" relay 13Z is continuously maintained through contacts D1, D2, D3 of relay 15D and contact ZM3 of switch ZM. The "raise" signals may additionally be routed by either or both of "raise" relays 12A, 12B so that units X, Y cannot be controlled to pick up load faster than master unit Z. The signal paths can readily be traced in Fig. 4C.

Figure 5:
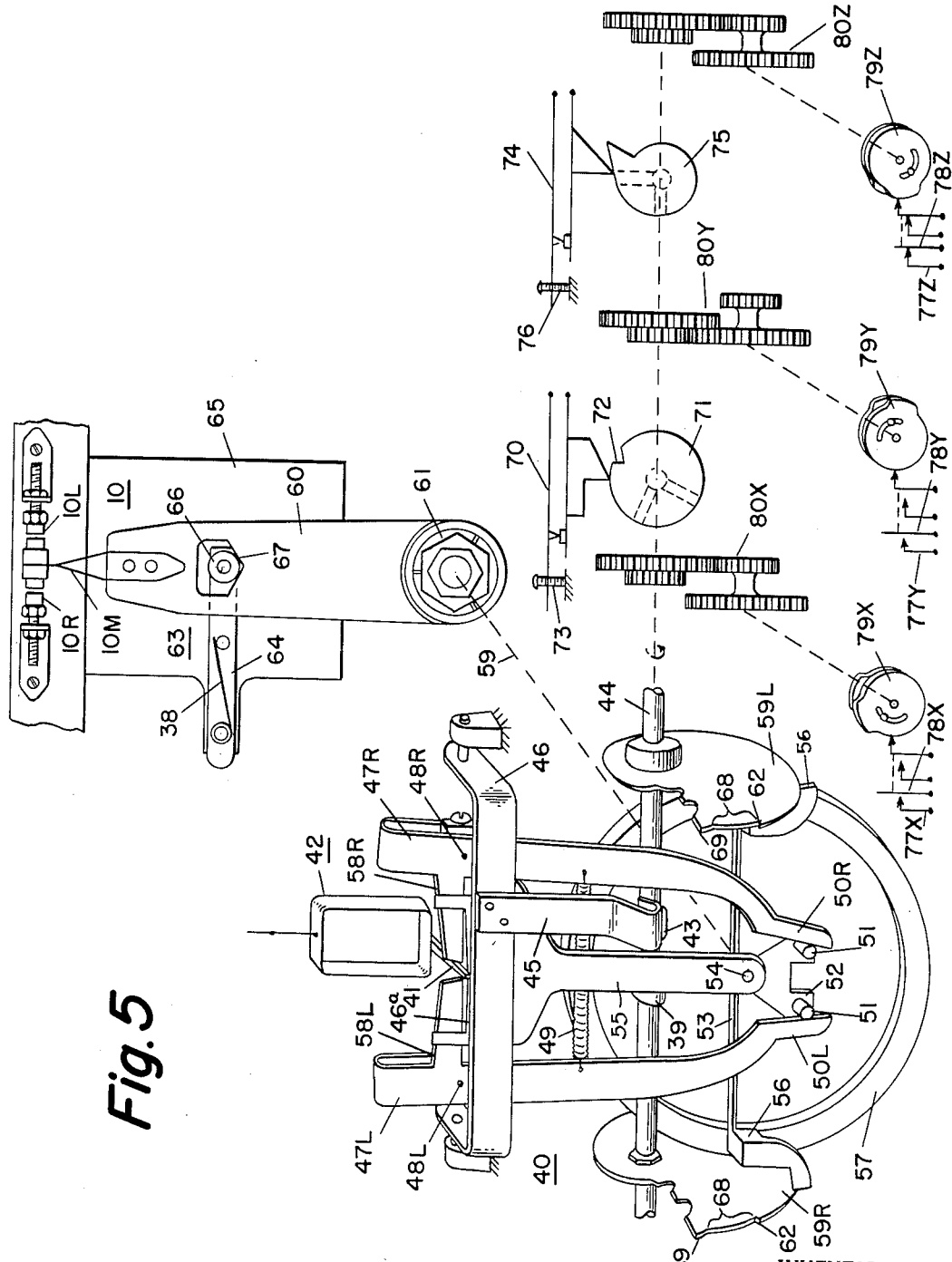
Fig. 5 illustrates significant constructional features of a controller suited for use in the system of Fig. 2.

In Fig. 5 is shown one suitable apparatus for effecting movement of sense switch 10 in accordance with deviations from schedule and for effecting energization of relay 15D for large deviations.

The mechanical relay mechanism 40 for actuating the movable contact 10M of switch 10 in accordance with the deflections of a pointer 41 is shown as similar to that of Leeds Patent 1,125,699 to which reference may be had for a more detailed description. Alternatively, this mechanism may be of the type shown in Squibb Patent 1,935,732 and Schock et al. Patent 2,313,272.

In brief, the pointer 41 is carried by the movable coil system 42 of a galvanometer responsive to unbalance of a network (not shown) such as a frequency-bridge, load-bridge or a load-frequency bridge, suited for the particular selected system variable. As examples of such networks, reference is made to Patents Nos. 1,751,539, Wunsch, 2,054,121, Doyle, Re. 20,548, Doyle.

The cam 43 on shaft 44 and in engagement with arm 45 periodically rocks the yoke 46 to effect engagement between the pointer 41 and the upper edge of plate 46a carried by the yoke. When the pointer 41 is in neutral position corresponding with null deviation of the system variable, it is in the gap between the adjacent ends of the horizontal arms 58R, 58L of feelers 47R, 47L supported by fixed pivots 48R, 48L. The spring 49 biases the feelers to maintain the lower ends of their vertical arms 50R, 50L respectively in engagement with pins 51 carried by plate 52 attached to rocker arm 53 pivoted at 54 to the arm 55.

To the opposite ends of rocker arm 53 are attached clutch shoes 56 movable into and out of engagement with a clutch disk 57 as independently pivoted arm 55 is rocked by cam 39.

If pointer 41 deflects from its neutral position beneath one or the other of the feeler arms 58R, 58L, the upward movement of yoke 46 is transmitted through the pointer 41 to that arm effecting its pivotal movement with consequent angular movement of clutch arm 53 in direction corresponding with the sense of deflection of pointer 41. The extent of angular movement of rocker arm 53 is proportional to the pointer deflections. Later in the cycle, after arm 55 has moved inwardly to effect engagement of clutch shoes 56 with clutch disk 57, one or the other of the restoring cams 59L, 59R engages the clutch arm 53 and returns it to the original horizontal position. As during that time, the rocker arm 53 is coupled to clutch disk 57 by the frictional engagement of clutch shoes 56, the clutch disk 57 and its shaft 59 are rotated in a direction and to an extent corresponding with the deflection of pointer 41.

The movable contact 10M of the sense switch 10 is carried by an arm 60 coupled through a friction clutch 61 to shaft 59 of the clutch disk 57. The "raise" and "lower" contacts 10R, 10L are mounted on a fixed support 65 in the path of movable contact 10M. Thus during restoring movement of arm 53 by one or the other of cams 59R, 59L, the contact 10M is moved into and maintained in engagement with one or the other of contacts 10R, 10L.

When the arm 53 rides off the point 62 of the restoring cam 59R or 59L, a spring-biased centering device or "click" 63 is effective to return arm 60 to its initial position for which contact 10M is in open-circuit position. Specifically, the centering device includes an arm 64 pivoted upon support 65 and carrying a roller 66 engaging a V-notch 67 in contact arm 60. The spring 38 continuously tends to force the roller 66 to centered position in the V-notch 67 and is effective to do so during the dwell afforded by sections 68 of the restoring cams.

As apparent from the foregoing description, the greater the deviation of pointer 41 from neutral position, the sooner one of the restoring cams engages clutch arm 53 in a revolution of shaft 44 and consequently the longer the period of engagement between contacts of the sense switch 10.

The terminal rise section 69 of the restoring cams returns the arm 53 to accurate horizontal position after disengagement of the clutch shoes 56 from disk 57 so to correct for the slight displacement due to action of the centering device 63.

The interrupter 70 is operated by cam 71 driven by shaft 44. The notch 72 of cam 71 briefly opens the contacts of interrupter 70 just after the clutch arm 53 is restored to horizontal position by one of the restoring cams, i. e., just after contact 10M of the sense switch has been restored to its neutral position. Timing of interrupter 70 may be effected by adjustment of screw 73 and/or adjustment of cam 71 on shaft 44.

A second interrupter 74 is operated by cam 75 driven by shaft 44. The cam 75 is so shaped that it closes interrupter 74 at a time suitably before arm 53 is engaged by cam 59R or 59L for the maximum deflection of pointer 41 and maintains it closed for deviations in excess of those for sequential control. The time of opening of interrupter 74 may be adjusted by screw 76 and/or adjustment of cam 75 on shaft 44.

Reverting to Fig. 2 for supplemental discussion when the apparatus of Fig. 5 is included therein, the interrupter 70 is in series with movable contact 10M between supply conductor 19 and the "raise" and "lower" conductors 20R, 20L. When contact 10M is actuated by restoring cam 59L to engage "lower" contact 10L, it effects energization of relay 11L whose contacts L1, L2 thereupon close to complete a seal-in circuit about contacts 10M, 10L for continued energization of relay 11L until interrupter 70 is opened by its cam 71. The energization of relay 11L also, through its contacts L3, L4, connects the interrupter 74 to supply line 19 through interrupter 70 so that for large deflections of pointer 41 with consequent early closure of sense switch 10, the interrupter 74 effects energization of relay 15D. Upon energization of relay 15D, its contact D7 closes to complete a seal-in circuit about interrupter 74 for continued energization until interrupter 70 opens.

Similarly, when contact 10M is actuated by restoring cam 59R to engage "raise" contact 10R, it effects energization of relay 11R whose contacts R1, R2 close to complete a seal-in circuit about contacts 10M, 10R for continued energization of relay 11R until interrupter 70 is opened by its cam 71. The energization of relay 11R also, through its contacts R3, R4, connects the interrupter 74 to supply line 19 through interrupter 70 so that for large deflections of pointer 41 with consequent early closure of sense switch 10, the interrupter 74 effects energization of relay 15D. Upon energization of relay 15D, its contact D7 closes to complete a seal-in circuit about interrupter 74 for continued energization of relay 15D until interrupter 70 opens.

Thus, so long as pointer 41 is away from its neutral position, for each cycle of the apparatus of Fig. 5, there is produced a signal pulse of duration which is the greater the deviation from schedule. This signal pulse is applied to conductor 20R of the "raise" circuit or conductor 20L of the "lower" circuit in dependence upon the sense of the deviation. For small deviations, these signal pulses are sequentially routed to the "raise" or "lower" signal relays as above in detail explained in discussion of Figs. 2, 3A–3C, 4A–4C.

When it is desirable that the number of pulses in an interval of time for any or all of the controlled units X, Y, Z shall be lower than that afforded by interrupter 70, there may be provided the auxiliary interrupters 77X, 77Y, 77Z for the "raise" relays and auxiliary interrupters 78X, 78Y, 78Z for the "lower" relays (Fig. 2). As shown in Fig. 5, the pairs of interrupters 77X, 78X, 77Y, 78Y; and 77Z, 78Z may each be controlled by cams 79X, 79Y, 79Z through suitable speed-change devices 80X, 80Y, 80Z. Furthermore, each of cams 79X, 79Y, 79Z may comprise a pair of disks which may be clamped in different angular positions to vary the effective length of the rise section of the cam and therefore the duration of closure of the associated contacts for each revolution of the cam.

By this arrangement, the automatic supervisory control may be adapted to the different response characteristics of the individual generating units to be controlled. If for any unit the rate of response is different for equal "raise" and "lower" signals, the same rate of response for them may be obtained by using separate cams for the interrupters 77, 78 of that unit and if necessary separate speed-change devices for the cams.

Figure 6:
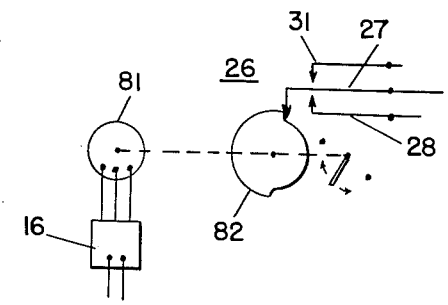
Fig. 6 illustrates a modification of the transfer relays shown in Fig. 2.

In the system of Fig. 2, as above described, the transfer relays 26A, 26B, 26C are of the reciprocating biased-armature type, operating a single-pole double-throw switch. Each of these relays may be of the type shown in Fig. 6 in which relay 26 comprises a reversible motor 81 for actuating a cam 82 to move contact 27 selectively into engagement with one or the other of contacts 28, 31 having the connections and functions of the correspondingly numbered contacts of each of relay 26A, 26B, 26C of Fig. 2.

Figure 7:
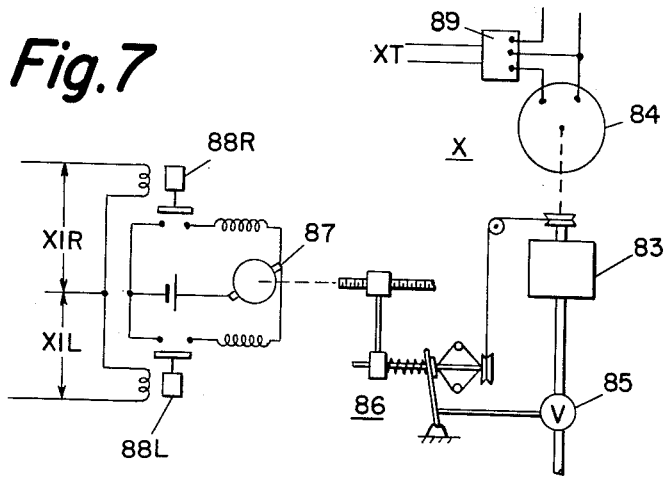
Fig. 7 illustrates an arrangement suited to utilize the signals from the system of Fig. 2 in controlling the input to a generating unit.

As exemplary of control of a generating unit by signals from the supervisory station, reference is made to Fig. 7 in which for simplicity the generating unit X comprises a single prime mover 83 and a generator 84. The input to the prime mover is controlled by valve 85 in turn controlled by governor 86. The governor setting is adjustable by reversible motor 87. The "raise" signals transmitted over channel XIR from the supervisory station excite relay 88R to energize motor 87 in direction causing increase of input to the prime mover 83. The "lower" signals received from the supervisory station over channel XIL excite relay 88L to energize motor 87 in opposite direction causing decrease of input to prime mover 83.

In either case, the resulting change in output of generator 84 is transmitted from transmitter wattmeter 89 of any suitable type over telemetering channel XT to the slide-wire actuating meter LX at the supervisory station. When, as more usual, the generating unit X is a station having several prime movers and generators, the "raise"

or "lower" signals may be utilized as shown in copending application Serial No. 211,663—Phillips—and their combined output signal transmitted over channel XT to supervisory station S.

Figure 8:
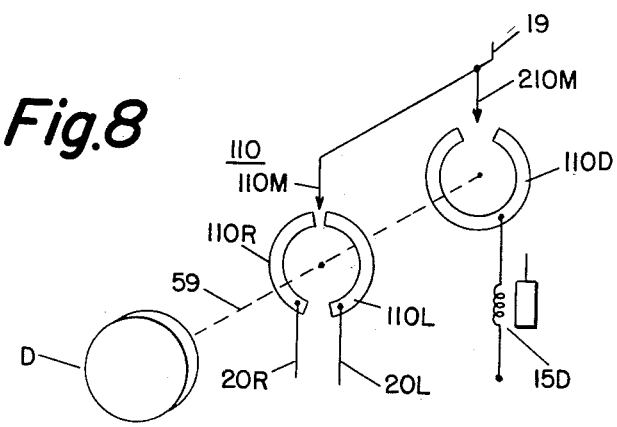
Fig. 8 is a modification of the controller shown in Fig. 5.

In some cases, a simpler apparatus than that shown in Fig. 5 may be used to produce the "raise" and "lower" signals and to provide for energization of relay 15D for large deviations. As shown in Fig. 8, the sense switch 110 corresponding with switch 10 of Fig. 2, comprises a pair of arcuate contacts 110R, 110L respectively corresponding with contacts 10R, 10L of Fig. 2. These contacts carried by shaft 159 of a suitable deviation meter D selectively engage contact 110M for small deviations selectively to connect conductors 20R, 20L to supply conductor 19 to effect sequential routing of the "raise" or "lower" signals as in the discussion above of Figs. 2, 3A–3C and 4A–4C. For larger deviations, the arcuate contact 110D carried by shaft 59 engages the contact 210M to energize relay 15D to effect simultaneous routing of the "raise" or "lower" signals as above discussed in connection with Figs. 2, 3A–3C, 4A–4C.

As another alternative, the contacts 210M, 110D of a deviation meter, Fig. 8, can be utilized to control relay 15D for large deviations, and the apparatus of Fig. 5, from which interrupter 74 will be omitted, used as previously described to provide signals applied through switch 10 to "raise" conductor 20R or "lower" conductor 20L.

In Fig. 8, the arcuate contacts 110R, 110L may be replaced by arcuate resistor elements, in which case the magnitude of the signal current is a function of the deviation from schedule; whereas with the apparatus of Fig. 5, the duration of a signal pulse is a function of the deviation from schedule. For utilization of signal currents of varying magnitude, the arcuate resistors would be respectively in circuit with two windings of a reversible motor, such as in Fig. 7, selectively under control of contact 110M; the particular motor in circuit depending upon the selection effected by the sequence relays 12A, 12B, 12C. For example, the two motor windings for unit X would replace the coils of relays 13X, 14X. Thus, each motor would operate in a direction and at a speed determined by the sense and magnitude of the deviation and under control of the sequence relays 12A, 12B, 12C and of simultaneous relay 15D.

From the foregoing explanation, it should be evident that the arrangements of Figs. 1 and 2 may be extended to effect sequential and simultaneous control of any number of generating units. It is to be understood the invention is not limited to the particular arrangements illustrated and comprehends modifications within the scope of the appended claims.

What is claimed is:

1. An arrangement for controlling two or more generating units interconnected to supply power to a common system and having signal channels to a supervisory station comprising means at said station responsive to deviations from a schedule value of a system variable, means for providing at said station effects respectively varying with change in output of the individual generating units, means for providing at the supervisory station signals demanding corrective change of output dependent upon the sense of the deviation, and switching means operable for small deviations to route said signals to said channels in sequence selected to maintain desired relation of the magnitude of said effects and operable for large deviations to route said signals to at least one channel regardless of the relative magnitudes of said effects and to other channels dependent upon the relative magnitudes of said effects.

2. An arrangement as in claim 1 in which the switching means includes sequence relays controlled by detectors responsive to unbalance of said effects.

3. An arrangement as in claim 2 additionally including a relay responsive to large deviations to maintain a signal path to a selected channel so long as the deviation is large.

4. In an arrangement for controlling two or more generating units interconnected to supply a common system, networks for providing effects respectively varying with change in output of the individual units, detectors responsive to unbalance of said effects, sequence relays controlled by said detectors to provide signal channels to the different individual units in dependence upon the detected unbalances, and deviation-responsive means including means responsive to small deviations from a scheduled value of a system variable providing corrective signals routed to the signal channel selected by the sequence relays and including means responsive to large deviations from said scheduled value of said system variable completing a signal path to one given channel for all settings of the sequence relays and to other channels dependent upon the settings of the sequence relays.

5. An arrangement as in claim 4 which includes switching means operable to select one of said units as a master by connecting said detectors for response to the unbalance between the effect corresponding with the master unit and the effect corresponding with each of the other units and by establishing the signal path for the master unit to be completed by said relay means for large deviations.

6. An arrangement as in claim 4 in which the means responsive to large deviations is a relay controlled by an element of the deviation-responsive means.

7. An arrangement as in claim 4 in which the deviation-responsive means produces signal pulses having a characteristic varying as a function of the magnitude of the deviation.

8. An arrangement as in claim 4 in which the deviation-responsive means includes a contact element deflected in accordance with the deviation and periodically-operated interrupters timed to provide signal pulses of duration varying as a function of the magnitude of the deviation.

9. An arrangement as in claim 4 in which the means responsive to large deviations is a relay controlled by deviation-responsive means distinct from the deviation-responsive means producing corrective signals.

10. In an arrangement for controlling generating units interconnected to supply power to a common system, a plurality of networks respectively including impedances set in accordance with the load relation to be maintained between said generating units and impedances varied each in accordance with the output of a corresponding one of said generating units, detectors respectively responsive to the unbalance between a pair of said networks, sequence relays controlled by said detectors to select signal channels to the respective generating units in dependence upon the detected unbalances, means producing signals corresponding with deviations from a scheduled value of a system variable, switching means responsive to small deviations of said system variable for completing a path for said signals to the channels sequentially selected by said sequence relays, and switching means responsive to large deviations of said system variable completing a path for said signals to a predetermined one of said channels irrespective of the settings of said sequence relays and simultaneously completing a path for said signals to the other channels as selected by said sequence relays.

11. In an arrangement for controlling generating units interconnected to supply power to a common system, switching means for selecting one of said units as the master unit, detectors respectively responsive to the unbalance between the output of the master unit and another of said units, sequence relays controlled by said detectors to select signal channels to said generating units in dependence upon the detected unbalances, means producing signals corresponding with deviations from a scheduled value of a system variable, switching means responsive to small deviations of said system variable for completing a path for said signals to the channels for all of said units as sequentially selected by said sequence relays, and switching means responsive to large deviations of said system variable completing a path for said signals to the channel for said master unit irrespective of the settings of said sequence relays and simultaneously completing a path for said signals to the other channels as selected by said sequence relays.

12. An arrangement of controlling two or more generating units to supply power to a common system which comprises means for monitoring the individual outputs of said generating units, means for monitoring a selected system variable, means responsive to the sense of deviation of said system variable from a scheduled value for producing signals demanding corrective change of output of said generating units, and means for routing said signals, all demanding generating changes of like sense, to said units individually in sequence when the deviation is small and for routing said signals simultaneously to two or more of said generating units when the deviation is large and until the deviation is reduced to a small deviation.

13. An arrangement as in claim 12 in which the signal-producing means provides signals having a characteristic which varies as a function of the magnitude of the deviation.

14. An arrangement as in claim 12 in which the signal-producing means provides signals whose amplitude varies as a function of the magnitude of the deviation.

15. An arrangement as in claim 12 in which the signal-producing means provides signal pulses having a characteristic which varies as a function of the magnitude of the deviation.

16. An arrangement as in claim 12 in which the signal-producing means provides signal pulses of substantially constant repetition rate and of duration varying in accordance with the magnitude of the deviation.

17. An arrangement for controlling a master generating unit and two or more slave generating units all interconnected to supply power to a common system comprising means for monitoring the individual ouputs of all of said generating units, means for monitoring a selected system variable, means responsive to the sense of deviation of said system variable from a scheduled value for producing signals demanding corrective change of output of said generating units, and means for routing said signals to said units in sequence to maintain a desired relation of the loads of the slave units to the load of the master unit during correction of small deviations and, during correction of large deviations, for routing said signals to said master unit and also simultaneously to any slave unit requiring change of generation in sense demanded by the signals to bring its output into said desired relation to the output of the master unit, said signals for a given deviation, large or small, being of like sense.

References Cited in the file of this patent

UNITED STATES PATENTS 2,039,426   Kerr -------------------- May 5, 1936